United States Patent [19]

Sussmuth

[11] 4,104,442

[45] Aug. 1, 1978

[54] SILICON NITRIDE-CONTAINING MATERIAL WITH SELF-GLAZING SURFACE AND PROCESS FOR ITS PRODUCTION

[75] Inventor: Godehard Sussmuth, Selb, Bazen, Fed. Rep. of Germany

[73] Assignee: Rosenthal AG, Fed. Rep. of Germany

[21] Appl. No.: 669,654

[22] Filed: Mar. 23, 1976

[30] Foreign Application Priority Data

Oct. 4, 1975 [DE] Fed. Rep. of Germany ....... 2544437

[51] Int. Cl.² ............................................. B32B 13/04
[52] U.S. Cl. ...................................... 428/428; 427/94; 427/93; 427/377; 427/380; 428/446
[58] Field of Search .......... 427/93, 94, 248 R, 248 E, 427/255, 399, 377, 380; 428/428, 446, 323

[56] References Cited

U.S. PATENT DOCUMENTS

| 2,741,565 | 4/1956 | Halverson | 427/255 |
|---|---|---|---|
| 3,455,729 | 7/1969 | Deeley | 427/255 |
| 3,811,928 | 5/1974 | Henney | 427/255 |

FOREIGN PATENT DOCUMENTS

| 1,151,475 | 5/1969 | United Kingdom | 427/93 |
|---|---|---|---|
| 887,942 | 1/1962 | United Kingdom | 427/93 |
| 909,271 | 10/1962 | United Kingdom | 427/255 |

*Primary Examiner*—Ellis Robinson
*Attorney, Agent, or Firm*—Ostrolenk, Faber, Gerb & Soffen

[57] ABSTRACT

The invention concerns a silicon nitride-containing material with a gas-tight surface and improved oxidation resistance, and the invention also relates to a process for the production of such material.

5 Claims, No Drawings

SILICON NITRIDE-CONTAINING MATERIAL WITH SELF-GLAZING SURFACE AND PROCESS FOR ITS PRODUCTION

BACKGROUND OF THE INVENTION

Gas-tight and oxidation resistant silicon nitride materials are often required in machines and in plants in recuperators, pipe lines, tanks, etc., wherein there are high application temperatures. There is interest in improving the oxidation resistance of silicon nitride materials used where gas tightness is absolutely necessary, for example, in combustion chambers, turbine blades and distributors.

Processes are known for producing gas-tight silicon nitride and for reducing its porosity.

"Powder Metallurgy International", vol. 6 (1974) p. 17 to 19 describes hot pressing silicon nitride with additives. Relatively great gas tightness is achieved. However, this process is only of interest for a limited number of applications because of the high costs and the limitation of the size and shape of the molded bodies.

Another known process consists of infiltrating or impregnating reaction-sintered silicon nitride with metal solutions or acids. The impregnated materials are converted into metal oxides inside the pores by temperature treatments, as suggested in German Offenlegungsschriften Nos. 2,360,343 and 2,351,162, but the material obtained has much poorer resistance to sudden temperature changes, as compared with pure silicon nitride. Additionally, this process is very energy-consuming since several successive infiltration-separation cycles are required to obtain the desired gas tightness.

It is also known to seal the surface of porous silicon nitride by applying glazes or coatings thereto, as described in German Offenlegungsschriften Nos. 2,041,587; 2,152,006; 1,646,796 and British Pat. No. 1,151,475. Such protective coatings crack easily during subsequent temperature treatments because the coefficients of thermal expansion of the silicon nitride and of the coatings differ considerably. Besides, it is technically extremely difficult to uniformly glaze or coat silicon nitride parts having complicated shapes or forms, e.g. recuperator blocks with very narrow long channels. Glazes customarily used in this field have the additional disadvantage that they either become sticky at temperatures below 1000° C, or they melt at such high temperatures that the silicon nitride material is dissolved with resultant evolution of nitrogen, which leads to a poorly adhering glaze.

German Offenlegungsschrift No. 2,132,623 describes a process for improving the strength of silicon nitride bodies by controlled oxidation.

U.S. Pat. No. 3,455,729 discloses improving the resistance of silicon nitride bodies to damage due to sudden temperature changes by treatment of the silicon nitride with lithium vapors.

It is an object of the invention to provide a silicon-nitride containing material with a tight surface and improved resistance to oxidation by means of additives. It is another object of the invention to provide a simple and economical process for producing the silicon-nitride containing material.

BRIEF DESCRIPTION OF THE INVENTION

The silicon nitride material of this invention has a self-glazing surface, after heating, of cordierite, eucryptite, spodumen, quartz or mixed crystals thereof in a vitreous phase and is obtained by the addition of ceramic, silicate-containing raw material in amounts of 3–25% by weight to the silicon raw materials. The foregoing minerals are present individually or in combination, and are embedded in a vitreous phase. The self-glazing surface has a similar coefficient of expansion as the silicon nitride, and thus rests firmly thereon forming a protective cover.

The invention also provides a process for the production of a gas-tight, silicon nitride-containing material in which the ceramic, silicate-containing additives in powder form are added to the silicon raw material. The raw material and conversion into silicon nitride are conventional and need not be described here. The resulting mixture is shaped and then converted by a temperature treatment at between 1000° C and 1500° C in an oxygen containing atmosphere into a self-glazing surface on a silicon nitride-containing body. Additives used in the process of the invention are the above-mentioned magnesium aluminum silicates (cordierite); lithium aluminum silicates (petalite, spodumen, eucryptite); their mixed crystals with quartz; and oxides or salts of magnesium, lithium and aluminum. These substances can be precalcined or premelted with small quantities of fluxes. The additives are ground to a particle size of less than 20 m$\mu$. The total content of the oxides or salts in the additives need not necessarily correspond to the stoichiometric composition of the cordierite, eucryptite or spodumen, because the coefficient of expansion of the glaze can be adapted optimally to the respective silicon nitride-containing material by varying the composition. The amount of additives is 3–25% of weight of the entire mixture. In a glaze using cordierite as the additive, the amount of cordierite added is preferably between 10 and 15% by weight. In a glaze using lithium salts as the additive, the addition is preferably between 5 and 10% of the entire mixture. Surprisingly, no vitreous phase appears after nitriding of a molded body formed with a composition according to the invention, even at temperatures far above the melting point of the additives. Also, no melt issues from the molded body during the nitriding. It is, therefore, assumed that the components of magnesium silicate or lithium aluminum silicate must have combined with the silicon nitride to solid solutions or mixed nitrides. Merely by the temperature treatment in an oxygen-containing atmosphere is a thin glaze coat on the molded body formed according to the invention.

Another feature of the invention is that the formation of the glaze coat must be affected in a brief period in an oxygen-containing atmosphere and that the heating rate should exceed 100° C per minute. This has the effect that not all glaze portions are melted at a particular temperature between 1000° C and 1500° C during formation of the glaze coat. Slow heating to this temperature of formation of the glaze coat must be avoided under any circumstances, otherwise the material not yet protected by the glaze will oxidize to cristobalite. The oxidation process can be carried out as follows according to the invention:

1. Use of a rapidly heatable furnace with normal atmospheric air.

2. The insertion of nitrated material parts in a preheated furnace with an oxygen containing atmosphere. Only relatively thin-walled parts can be used. Otherwise, there is a risk of cracking.

3. Transferring to an air or oxygen-containing atmosphere after the nitration or sintering to the cooling phase. The last-mentioned technological step is very simple to handle and also saves energy and costs.

DESCRIPTION OF PREFERRED EMBODIMENTS

The invention will be described more fully on the basis of preferred embodiments. It should be pointed out, however, that various modifications are possible in this embodiment. In particular, the additives mentioned below can usually be combined with the silicates within the above-mentioned ranges without departing from the basic concept of the invention.

EXAMPLE 1

90 parts by weight silicon powder and 10 parts by weight of ground cordierite potsherds were mixed in a ball mill with isopropanol for 5 hours. After removal of the isopropanol by drying, a dry pressed granulated material was produced by adding polyethylene glycol, ammonium alginate and methyl cellulose. From this granulated material were pressed bars measuring 35 × 3.5 × 3.5 mm. Subsequently, the binders were removed by a temperature treatment and the bars were nitrided in known manner. A final temperature of 1550° C was attained. These bars were light-grey in color and did not differ in their appearance from bars produced in the same manner from pure silicon powder. A portion of each of the bars was heated in a tubular furnace in an argon atmosphere to 1450° C, and air was conducted for 10 minutes through the pipe. The bars were covered after this treatment by a thin continuous glaze, but the interior of the bars was not glazed. It was found, as can be seen from Table 1, that the strength of the glazed bars was not reduced after an oxidation treatment for 8 hours, while in oxidized bars of pure silicon nitride treated in the same manner, cristobalite was formed and the strength of the bars was diminished.

Table 1

| Strength behavior of glazed and unglazed silicon nitride bodies after oxidation treatment | | | |
| --- | --- | --- | --- |
| before | oxidation for 8 hours | unglazed | 42.83 N/mm$^2$ |
| " | " | glazed | 43.05 N/mm$^2$ |
| after | " | unglazed | 39.40 N/mm$^2$ |
| " | " | glazed | 43.65 N/mm$^2$ |

EXAMPLE 2

A mixture of 85% by weight of silicon and 15% by weight of cordierite potsherds was prepared in the manner described in Example 1 and was provided with organic plasticizers. By extrusion, round bars of 10 mm diameter were produced and these bars were nitrated after burning the binders for 144 hours at a temperature of 1450° C. A part of each of the bars was subsequently provided with a self-glazing surface by subjecting it at 1450° C to an oxidation. Subsequently, these bars are placed for 10 minutes in a furnace at 1300° C. They are removed from the furnace and are cooled with compressed air. This test was repeated 10 times. It was found that no cracks appeared in the glaze. Instead, the strength of these bars increased by about 10%, compared to untreated non-glazed bodies.

EXAMPLE 3

A film-casting compound was produced with the composition described in Example 1. A sheet having a thickness of 0.8 mm was drawn using a doctor blade. After the binders were burned out of the material, the material was mitrided at a burning temperature of 1550° C. The silicon nitride films thus produced showed no vitreous phase. Then a part of each of these sheets was exposed to air for 20 minutes at a temperature of 1430° C so that the surface was coated with a uniform thin coating.

The permeability to air of glazed and unglazed sheets was measured. The permeability of the unglazed sheet was 0.65 cm$^3$/cm$^2$.s. After glazing, the sheet had a permeability of 0.04 cm$^3$/cm$^2$.s, which corresponds approximately to the leakage rate of the measuring instrument used.

The invention produces a uniformly tight and firmly adhering glaze on all surface parts of the molded body. The glaze is even formed in the interior of channel-type ducts which may have a cross-section of less than 1 qmm. Such internal glazed surfaces cannot be obtained by known methods such as dipping, brushing or spraying with conventional glaze slips. The high application temperature of about 1350° C for this glaze coat should be noted. The self-glazing surface can be obtained without major additional process steps by treating the silicon nitride-containing body briefly in an oxygen containing atmosphere at a relatively high temperature. Additionally, damaged parts can be reglazed by a simple heat treatment in the air.

Although this invention has been described with respect to preferred embodiments, it should be understood that many variations and modifications will now be obvious to those skilled in the art, and it is preferred, therefore, that the scope of the invention be limited, not by the specific disclosure herein, but only by the appended claims.

The embodiments of the invention in which an exclusive privilege or property is claimed are defined as follows:

1. A process for the production of a silicon nitride-containing material with a gas-tight surface and improved oxidation resistance which comprises admixing 3–25 percent by weight based on the weight of the resulting admixture of at least one powdered ceramic, silicate-containing additive having a particle size of less than 20 mµ and the silicon raw material, subjecting the admixture to standard nitriding condition and subjecting the nitrided admixture to a heat treatment between 1,000° C and 1,500° C in an oxygen-containing atmosphere, wherein said admixture is heated to said temperature at a rate exceeding 100° C per minute, nitride-containing material.

2. Process for the production of a silicon nitride-containing material according to claim 1, characterized in that the heat treatment is effected in air.

3. Process for the production of a silicon nitride-containing material according to claim 1, characterized in that the additive is magnesium aluminum silicate in an amount of 10–15 weight percent.

4. Process for the production of a silicon nitride-containing material according to claim 1, characterized in that lithium aluminum silicate is an amount of 5–10 weight percent.

5. A silicon nitride-containing body having a gas tight surface and improved resistance to oxidation produced by the process of claim 1.

* * * * *